(12) United States Patent
Sun (10) Patent No.: US 11,504,941 B2
(45) Date of Patent: Nov. 22, 2022

(54) ADAPTION OF TEXTILE ARTICLE FOR RADIO FREQUENCY (RF) ABSORPTION AND ATTENUATION

(71) Applicant: Conrad Sun, New York, NY (US)

(72) Inventor: Conrad Sun, New York, NY (US)

(*) Notice: Subject to any disclaimer, the term of this patent is extended or adjusted under 35 U.S.C. 154(b) by 253 days.

(21) Appl. No.: 16/705,139

(22) Filed: Dec. 5, 2019

(65) Prior Publication Data

US 2020/0180262 A1 Jun. 11, 2020

Related U.S. Application Data (60) Provisional application No. 62/775,694, filed on Dec. 5, 2018.

(51) Int. Cl.
  *B32B 5/00* (2006.01)
  *B32B 15/00* (2006.01)
  (Continued)

(52) U.S. Cl.
  CPC ............ *B32B 5/24* (2013.01); *B29B 15/10* (2013.01); *H01Q 17/005* (2013.01); *B29B 15/105* (2013.01); *B29B 15/122* (2013.01); *B32B 2262/0261* (2013.01); *B32B 2262/0276* (2013.01); *B32B 2262/065* (2013.01); *B32B 2264/102* (2013.01); *B32B 2317/22* (2013.01); *B32B 2333/00* (2013.01); *B32B 2383/00* (2013.01); *B32B 2437/00* (2013.01)

(58) Field of Classification Search
  CPC .... B32B 5/00; B32B 5/20; B32B 5/24; B32B 15/00; B32B 15/10; H01Q 17/00; H01Q 17/005
  See application file for complete search history.

(56) References Cited

U.S. PATENT DOCUMENTS 8,679,393 B1 3/2014 Willwerth et al.
2004/0254625 A1 12/2004 Stephens et al.
(Continued)

FOREIGN PATENT DOCUMENTS

WO 2007101646 A1 9/2007

OTHER PUBLICATIONS

International Application No. PCT/US2019/064793, International Search Report and Written Opinion dated Feb. 25, 2020, 19 pages.

*Primary Examiner* — Jacob T Minskey
*Assistant Examiner* — Matthew Hoover
(74) *Attorney, Agent, or Firm* — Han Santos, PLLC (57) ABSTRACT

The present disclosure describes techniques for fabricating a textile article from a laminate formed by curing a reinforced fiber matrix and a resin substrate. The resin substrate may include iron oxide particles, such as iron oxide, $Fe_3O_4$, that are capable of absorbing and attenuating RF signals within a desired RF signal range, namely 0 GHz-3 GHz, 3 GHz, -8 GHz, and greater than or equal to 10 GHz. The iron oxide particles may include $Fe_3O_4Fe$, $Fe_3O_4Ni$, or $Fe_3O_4$, and/or so forth. Each iron oxide particle is selected based on the RF signal range that the textile article is intended to absorb. In other words, a change in iron oxide particle composition and proportion by volume may impact the RF signals absorbed and attenuated by the textile article.

20 Claims, 5 Drawing Sheets

(51) Int. Cl.
*H01Q 17/00* (2006.01)
*B32B 5/24* (2006.01)
*B29B 15/10* (2006.01)
*B29B 15/12* (2006.01)

(56) References Cited

U.S. PATENT DOCUMENTS

2014/0375424 A1 12/2014 Juez et al.
2016/0354466 A1* 12/2016 Gabriele .............. C08G 63/914
2018/0071975 A1* 3/2018 Sun ......................... B32B 15/08

* cited by examiner

FIG. 1A (Section A-A)
FIG. 1B

FIG. 2
(Exploded view of components of resin substrate through Section A-A of FIG. 1A)

FIG. 3
(Exploded view of components of wet laminate through Section A-A of FIG. 1A)

FIG. 4

ADAPTION OF TEXTILE ARTICLE FOR RADIO FREQUENCY (RF) ABSORPTION AND ATTENUATION

RELATED APPLICATION

This application claims priority to a commonly owned, U.S. Provisional Patent Application No. 62/775,694, filed on Dec. 5, 2018, and titled "Adaption of Magnetic Fabric for Radio Frequency Absorption," which is herein incorporated by reference in its entirety.

BACKGROUND

Present-day, textile article trends in clothing, upholstery, and textile design lack, or simply not prioritize, the absorption or attenuation of electromagnetic energy, also referenced to Radio Frequency (RF) signals. As technology continues to progress and more and more electronic devices become increasingly common in all industries, the focus on the absorption and attenuation of RF signals is becoming more important.

Passive absorbers have long been used to absorb and attenuate RF signals, particularly inside test chambers such as an anechoic chamber. Generally, the principal objective of these absorbers is to coat reflective surfaces so any incident RF signals that strike the absorber is largely absorbed and attenuated, rather than being reflected. The absorbers create an environment having no reflective boundaries so radar systems and antennas can be tested as if you are testing in an open field. However, these absorbers are typically coatings on fixed surfaces, such as the walls on an anechoic chamber. Further, similar coatings are less effective on surfaces that tend to be flexible and adopt varying shapes and contours through their normal course of use, such as what would be expended for textile articles.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a plan view of the textile article. FIG. 1B illustrates a cross-section view through Section A-A of FIG. 1A.

DETAILED DESCRIPTION

This disclosure describes techniques that improve the radar absorbing and attenuating capability of a textile article. Radar systems operate by sending out pulses of electromagnet energy, which are reflected back from an object to a radar controller. Radar controllers may detect the presence of an object based on its reflected electromagnetic energy, namely the object's radar signature. By reducing an object's radar signature, radar controllers are less likely to detect the object.

Reducing a textile article's radar signature can be performed by reducing electromagnetic energy reflection and providing sufficient attenuation of electromagnetic energy once it has interacted with a textile article. This disclosure describes techniques that improve a textile article's radar signature via the inclusion of iron oxide particles within a resin substrate that act to absorb (i.e. attenuate) electromagnetic energy. The geometry of individual iron oxide particles is further described to minimize electromagnetic energy reflection. For example, flake-shaped iron oxide particles have a greater relative surface area relative to spherical iron oxide particles. In turn, the use of flake-shaped iron oxide particles may lead to a greater degree of electromagnetic energy reflection relative to spherical iron oxide particles. In that regard, while the presence of iron oxide particles may influence the attenuation of electromagnetic energy, the shape of the iron oxide particles further influences the electromagnetic energy reflection, the corollary of which, in combination, is a reduced electromagnetic energy signature.

More specifically, this disclosure is directed towards techniques for fabricating a textile article that is configured to absorb and attenuate electromagnet energy, also termed radio frequency (RF) signals throughout this disclosure, within a range of 0 GHz to 10 GHz.

The fabrication process of a textile article from a laminate formed by curing a reinforced fiber matrix and a resin substrate. The resin substrate may include iron oxide particles, such as iron oxide, $Fe_3O_4$, that are capable of absorbing and attenuating RF signals within the desired RF signal range, namely 0 GHz-3 GHz, 3 GHz, -8 GHz, and greater than or equal to 10 GHz. The iron oxide particles may include $Fe_3O_4Fe$, $Fe_3O_4Ni$, or $Fe_3O_4$, and/or so forth. Each iron oxide particles are selected based on the RF signal range that the textile article is intended to absorb. In other words, a change in iron oxide particle composition and proportion by volume may impact the RF signals absorbed by the textile article. For example, a soft ferrite, such as $Fe_3O_4Fe$ may be capable of absorbing low radio frequency signals that are less than 3 GHz. Moreover, an iron oxide, such as $Fe_3O_4Ni$, may be capable of absorbing radio frequency signals within a range of 3 to 8 GHz, and a soft ferrite, such as $Fe_3O_4$, may be capable of absorbing high radio frequency signals that are greater than or equal to 10 GHz.

Moreover, this disclosure describes techniques for introducing iron oxide particles into a wet laminate such that the shape and profile of the wet laminate can be manipulated prior to cure. The fabrication process is intended to allow the iron oxide particles to coalesce with an elastic polymer solution to form a resin substrate that retains the radar absorbing properties. In doing so, the iron oxide particles may be uniformly distributed on a reinforced fiber matrix (i.e. mesh matrix) when the resin substrate is combined with the reinforced fiber matrix.

The fabrication process may involve generating a wet laminate by saturating a reinforced fiber matrix within the resin substrate. The reinforced fiber matrix may comprise of a bamboo fiber matrix. Alternatively, the reinforced fiber matrix may comprise any type of fabric, including but not limited to, cotton, polyester, nylon, wool, and/or so forth. The selection of the reinforced fiber matrix may be influenced by the density of the reinforced fiber matrix (i.e. fiber volume ratio) and the desired flexibility and stretch of the intended textile article. For example, an increase in the density of a reinforced fiber matrix may result in an improvement in the resin substrate penetration.

Additionally, the fabrication process may include a resin substrate that is formed by combining the iron oxide particles with an elastic polymer solution. The elastic polymer solution may include a latex elastic polymer solution, that encapsulates the iron oxide particles and cures at room temperature. Alternatively, the elastic polymer solution may comprise any type of natural rubber, acrylic, or silicone-based elastic polymer solution that can properly bond with the iron oxide particles. The selection of the elastic polymer solution is based at least in part on the integrity of the bond between the elastic polymer solution and the iron oxide particles and the cure time in a predetermined ambient environment. The integrity of the bond between the elastic polymer solution and the iron oxide particles may facilitate a uniform distribution of the iron oxide particles within the elastic polymer solution and ensure that the iron oxide particles are not ejected from the elastic polymer solution when combined with a reinforced fiber matrix or during the curing process.

Further, the cure time associated with the curing process may be impacted, and/or manipulated, by the ambient environment. For example, the ambient environment in which the curing process occurs may provide an operator of the fabrication process with a predetermined amount of time to overlay the resin substrate (i.e. which includes the combination of the iron oxide particles and the elastic polymer solution) on to the reinforced fiber matrix. Doing so may ensure a uniform distribution of the iron oxide particles over the wet laminate. In some examples, an operator may perform one or more radar-absorbing tests on the wet laminate, prior to or during the curing process. These tests may ensure that the wet laminate has a uniform distribution of iron oxide particles. In this way, the resulting textile fabric may have uniform RF signal absorbing properties across all sections of the textile fabric. In one example, the cure time for a resin substrate (i.e. a latex elastic polymer solution) may be 30 minutes to one hour, depending on environmental conditions. Any cure time is possible. Other factors that may impact the cure time include the relative proportion of fiber reinforcement matrix to the resin substrate. Additionally, the cure time of a resin substrate may be impacted by the ambient room temperature climate. For example, a resin substrate (i.e. which includes the combination of the iron oxide particles and the elastic polymer solution) that cures at room temperature in a moist (i.e. humid) environment may have a different cure time to a same resin substrate the cures at room temperature in a dry (i.e. less humid) environment.

Moreover, the fabrication process may include combining a predetermined ratio of iron oxide particles with the resin substrate. The predetermined ratio may be influenced by the desired durability of the textile article, the desired flexibility, and more importantly, the RF signal range that the textile article is intended to absorb.

In one example, a textile article that is intended to absorb RF signals within a range of 3 to 8 GHz may comprise of a 1:16 ratio by volume of $Fe_3O_4Ni$ to the elastic polymer solution. However, any variation of the 1:16 ratio is possible. The predetermined volume ratio may also impact the viscosity of the resulting resin substrate (i.e. $Fe_3O_4Ni$+elastic polymer solution). For example, if the proportion of $Fe_3O_4Ni$ increases within the resin substrate (i.e. the ratio by volume of $Fe_3O_4Ni$ to elastic polymer solution increases—1:18) then the viscosity of the resin substrate may increase (i.e. a higher viscosity means that the resin substrate exhibits more resistance to gradual deformation by shear stress or tensile stress and flows less freely—reduced flow rate). In this example, the resin substrate may be more difficult to uniformly distribute onto a reinforced fiber matrix.

In another example, a textile article that is intended to absorb RF signals that are greater than or equal to 10 GHz may comprise a predetermined ratio by volume of $Fe_3O_4$ to the elastic polymer solution equivalent to 1:16. While increasing the proportion of $Fe_3O_4$ relative to the elastic polymer solution may be 1:16 may improve radar absorption properties, it is noteworthy that by increasing the proportion of $Fe_3O_4$, within the resin substrate, similar to $Fe_3O_4Ni$, the resin substrate may be more difficult to uniformly distributed over a reinforced fiber matrix.

In order to counteract the effect of a reduced flow rate of a resin substrate (i.e. high viscosity), the fabrication process further describes the selective inclusion of a thinning fluid or cure retarder. The thinning fluid or cure retarder may include distilled water, ammonia, acetone, or paint thinner. In these examples, the proportion of the thinning fluid that is added to the resin substrate is functionally based on the desired viscosity and adhesive properties of the resin substrate to the reinforced fiber matrix. Further, the curing retarder may increase the duration of the curing process, providing an operator with sufficient time to uniformly distribute the resin substrate over a reinforced fiber matrix.

In yet another example, a textile article that is intended to absorb RF signals that are less than 3 GHz may comprise a predetermined ratio by volume of $Fe_3O_4Fe$ to the elastic polymer solution of 1:16. For the sake brevity, the effects of changing the predetermined ratio by volume of $Fe_3O_4Fe$ to the elastic polymer solution is substantially similar to the effects described for the predetermined ratio by volume of $Fe_3O_4$ to the elastic polymer solution that is intended for the absorption of RF signals that are greater than or equal to 10 GHz. Therefore, the impact increasing the predetermined ratio by volume beyond 1:16, such as 1:18, can be mitigated, to some extent, by including a thinning fluid or cure retarder.

Moreover, this disclosure further describes a textile fabric that is intended to absorb RF signals across an entire range, namely less than 3 GHz through to RF signals that are greater than 10 GHz. In this example, the fabrication process is configured to include a combination of iron oxide particles, namely, $Fe_3O_4Fe$, $Fe_3O_4Ni$, and $Fe_3O_4$, within the elastic polymer solution at a predetermined ratio by volume of 1:1:1:3. The predetermined ratio by volume of 1:1:1:3, is provided for example purposes, and variations of this predetermined ratio by volume are possible. In the illustrated example of a resin substrate based on a predetermined ratio by volume of 1:1:1:3, an equal portion of each iron oxide particle is added to a 3-part portion of the elastic polymer solution. Since the relative portion of the iron oxide particles is substantially similar to the 3-part elastic polymer solution, the viscosity of the resin substrate (i.e. iron oxide particles and elastic polymer solution) may be difficult to uniformly distributed over a reinforced fiber matrix. In these instances, a thinning fluid or cure retarder may be added, at room temperature, and prior to the curing process, and prior to combining the resin substrate with the reinforced fiber matrix. As discussed earlier, the thinning fluid may reduce the viscosity of the resin substrate (i.e. a lower viscosity means that the resin substrate exhibits less resistance to gradual deformation by shear stress or tensile stress and flow more freely—increased flow rate). Further, the curing retarder may provide the operator with sufficient time to uniformly distribute the resin substrate over the reinforced fiber matrix.

The term "laminate," as used herein, describes the post-cure material (i.e. a textile article that is formed by combining the reinforced fiber matrix and the resin substrate. The term "wet laminate" as used herein, describes a fabrication state, prior to cure, whereby a reinforced fiber matrix is saturated (i.e. wet) with a resin substrate, and the resin substrate remains in a liquid state. The wet laminate may further undergo a curing process, by which the fiber reinforce matrix and resin substrate bind together to form a rigid, laminate (i.e. a textile article).

Further, the term "techniques," as used herein, may refer to system(s), method(s), computer-readable instruction(s), module(s), algorithms, hardware logic, and/or operation(s) as permitted by the context described above and through the document.

Figure 1A:
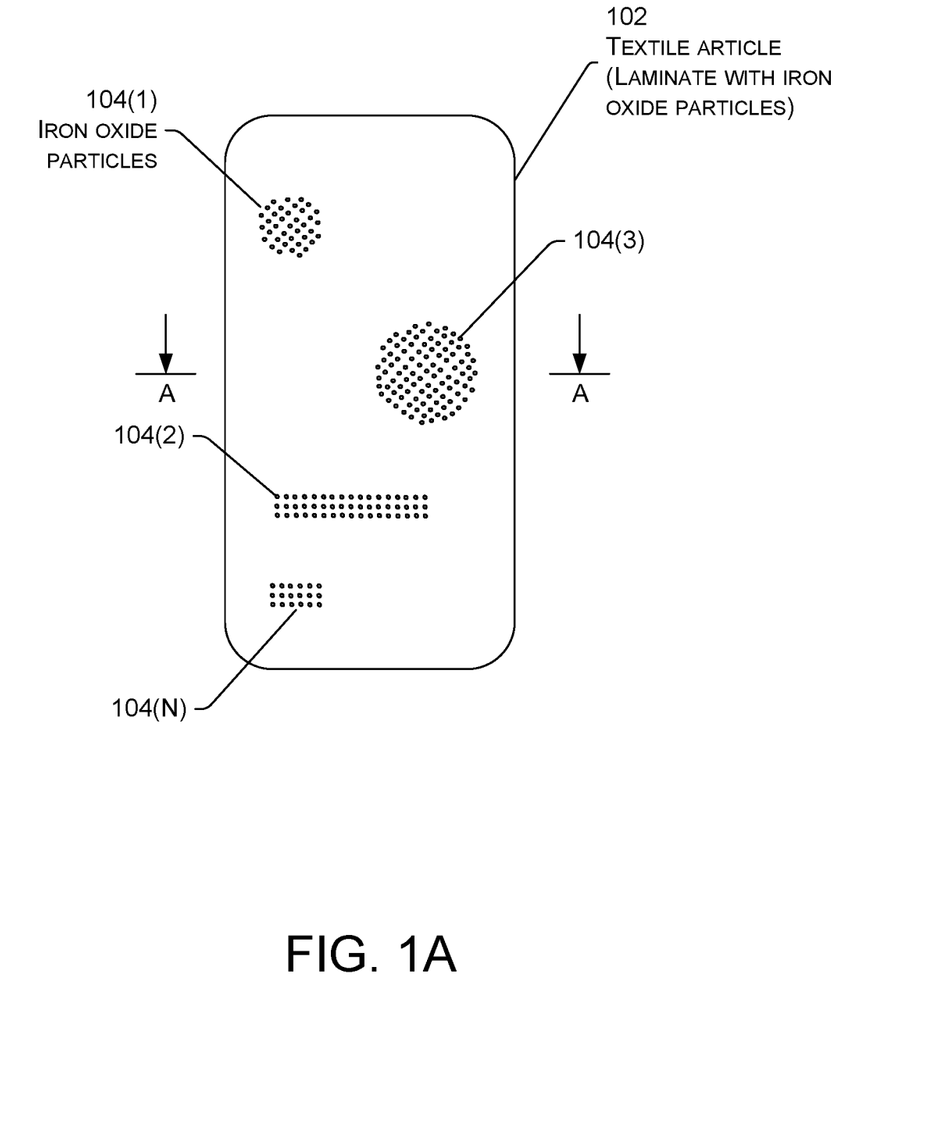
FIGS. 1A and 1B illustrate an example textile article that incorporates iron oxide particles within a resin substrate that is cured to form the textile article.
Figure 1B:
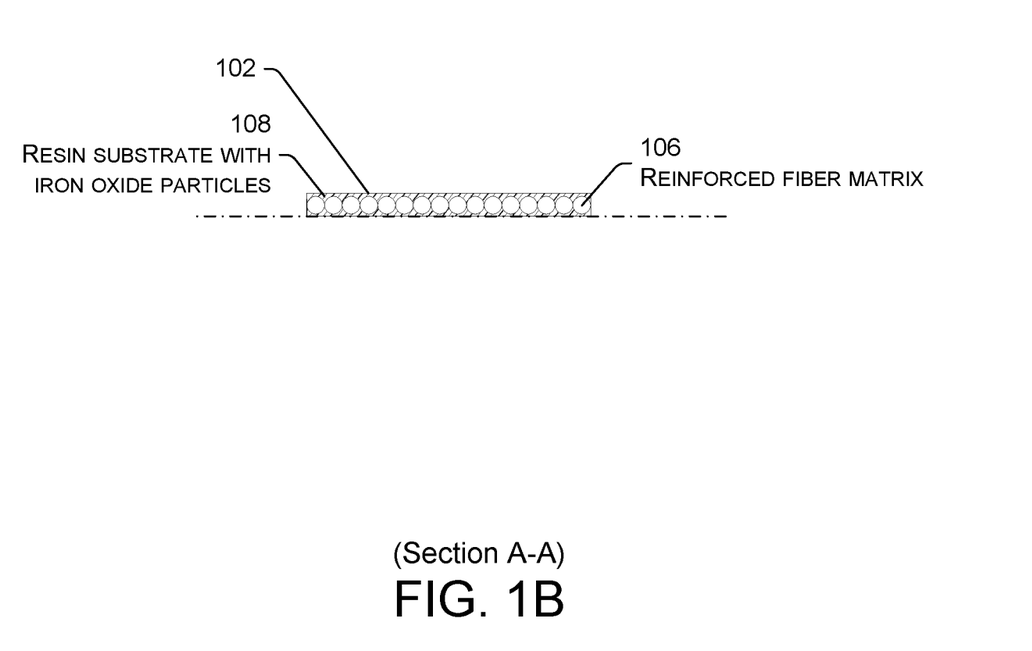

FIGS. 1A and 1B illustrate a textile article 102 (i.e. laminate) that incorporates iron oxide particles within a resin substrate that is cured to form the textile article 102. FIG. 1A illustrates a plan view of the textile article 102. More specifically, the textile article 102 may incorporate iron oxide particle(s) 104(1)-104(N). While FIG. 1A illustrates for regions of iron oxide particle(s) 104(1)-104(N), any number of regions is possible. In a preferred embodiment, the iron oxide particles cover the entire surface area of the textile article. Further, it is noteworthy that the textile article 102 may be interchangeably referred to as "laminate" in a post-cured state, and "wet laminate" in a pre-cured state.

FIG. 1B illustrates a cross-section view through Section A-A of FIG. 1A. FIG. 1B illustrates a cross-sectional view of the textile article 102 through one region of iron oxide particle(s) 104(1)-104(N). The cross-sectional view of the textile article 102 illustrates the reinforced fiber matrix 106 and the resin substrate 108 that incorporates the iron oxide particle(s) 104(1)-104(N).

Figure 2:
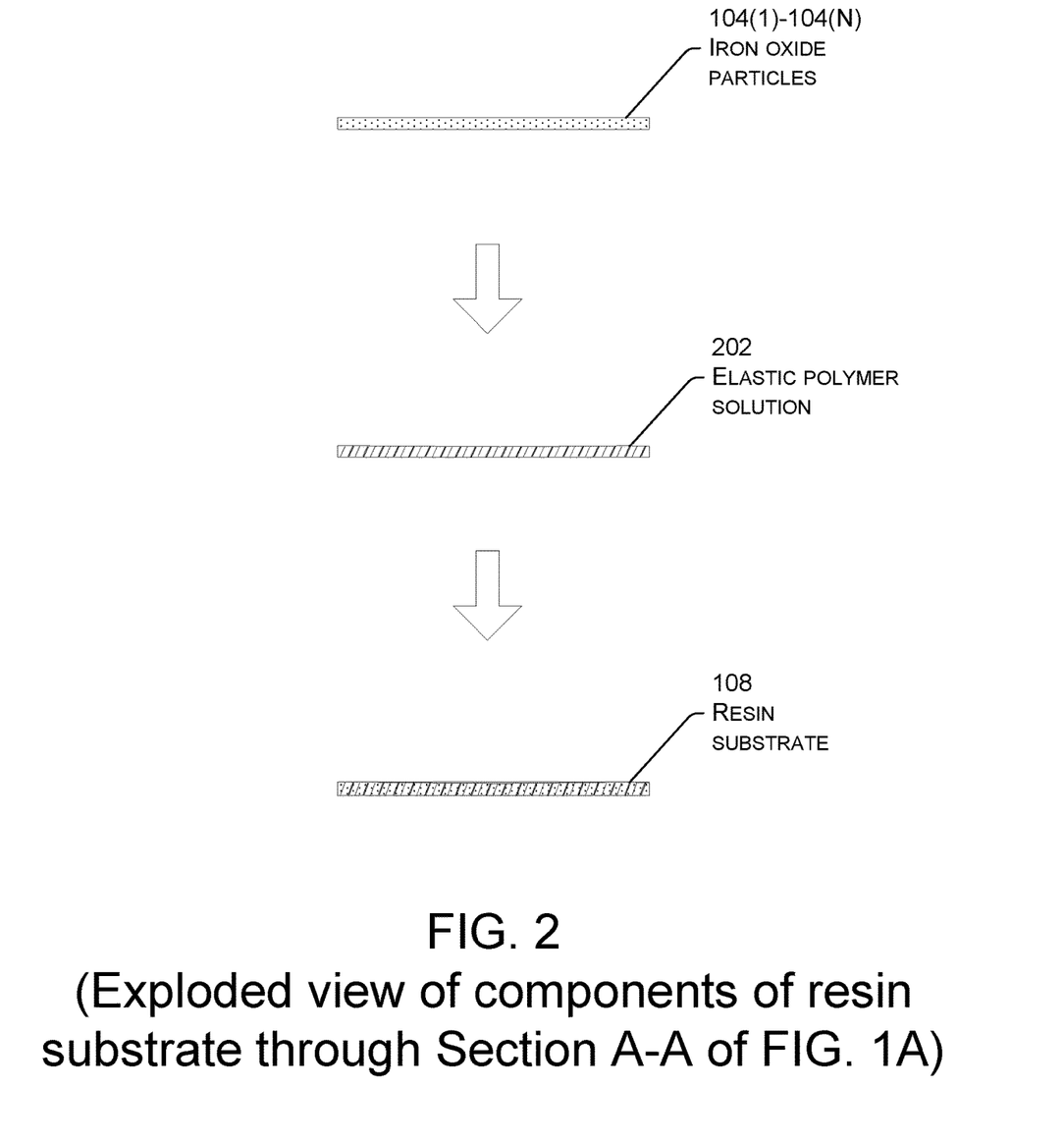
FIG. 2 illustrates a block diagram of components of the resin substrate as viewed through Section A-A of FIG. 1A.

FIG. 2 illustrates a block diagram of components of the resin substrate as viewed through Section A-A of FIG. 1A. More specifically, iron oxide particle(s) 104(1)-104(N) are mixed with an elastic polymer solution 202 to form the resin substrate 108. The iron oxide particle(s) 104(1)-104(N) may comprise one or more types of iron oxide particles, such as $Fe_3O_4Fe$, $Fe_3O_4Ni$, and $Fe_3O_4$. The selection of the iron oxide particles is based at least in part on the intended RF signal range that requires absorption and attenuation. In various examples, the iron oxide particles may be spherical so as to reduce RF signal reflection from the textile article.

Further, the elastic polymer solution 202 may include a latex elastic polymer solution, that encapsulates the iron oxide particles and cures at room temperature. Alternatively, the elastic polymer solution may comprise any type of natural rubber, acrylic, or silicone-based elastic polymer solution that can properly bond with the iron oxide particles. The selection of the elastic polymer solution is based at least in part on the integrity of the bond between the elastic polymer solution and the iron oxide particles and the cure time in a predetermined ambient environment.

An additional thinning fluid or a cure retarder may be added to the combination of the iron oxide particle(s) 104(1)-104(N) and elastic polymer solution for the purpose of adjusting the viscosity of the resin substrate 108 and/or the adhesive properties of the resin substrate 108 relative to the reinforced fiber matrix. By way of example, a thinning fluid or cure retarder may include distilled water, ammonia, acetone, or paint thinner.

Figure 3:
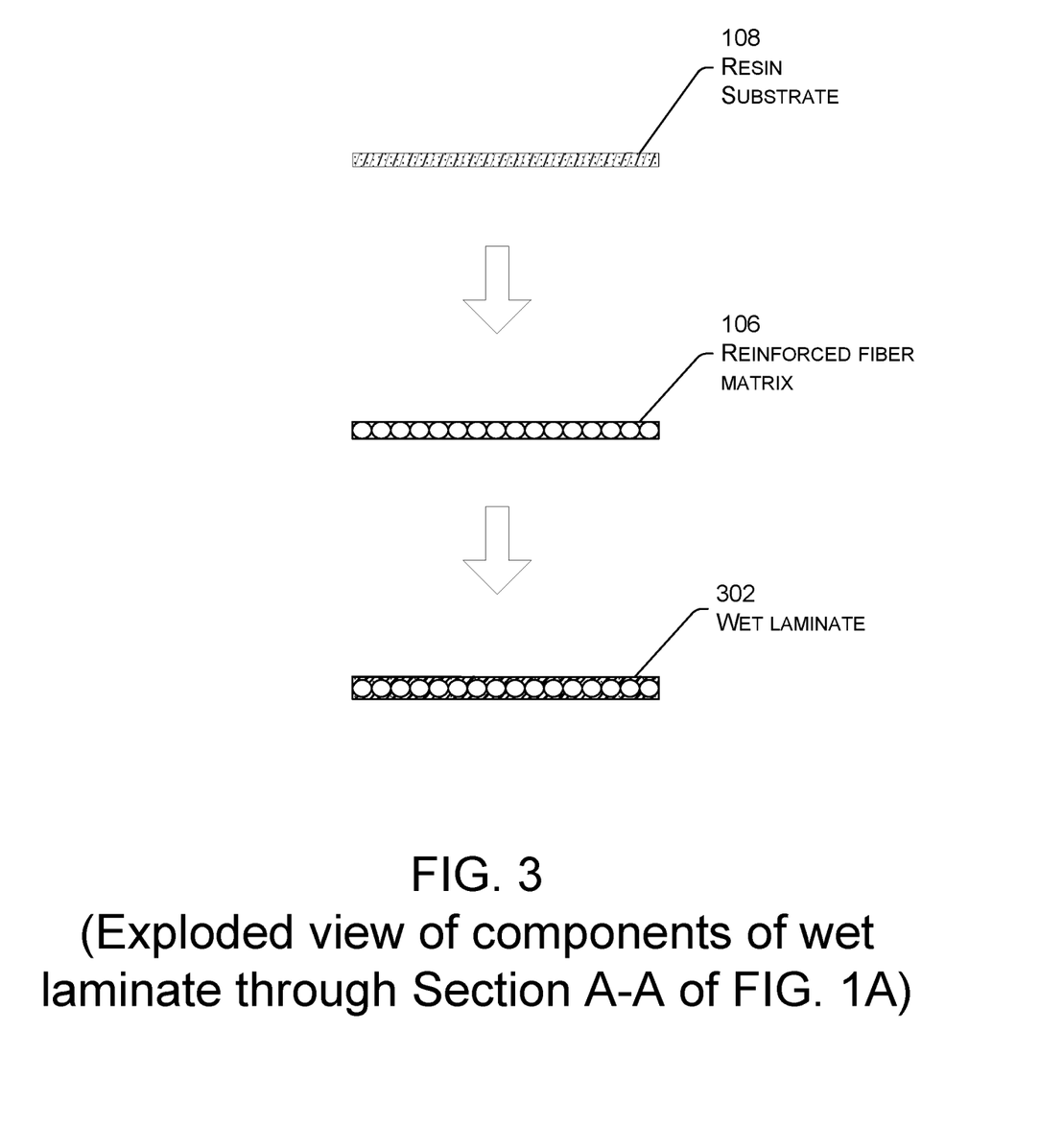
FIG. 3 illustrates a block diagram of components of the wet laminate as viewed through Section A-A of FIG. 1A.

FIG. 3 illustrates a block diagram of components of the wet laminate as viewed through Section A-A of FIG. 1A. More specifically, the resin substrate 108 is combined with the reinforced fiber matrix 106 to form the wet laminate 302.

The reinforced fiber matrix 106 may correspond to a bamboo fiber matrix. Alternatively, the reinforced fiber matrix may comprise any type of fabric, including but not limited to, cotton, polyester, nylon, wool, and/or so forth. The selection of the reinforced fiber matrix may be influenced by the density of the reinforced fiber matrix (i.e. fiber volume ratio) and the desired flexibility and stretch of the intended textile article. For example, an increase in the density of a reinforced fiber matrix may result in an improvement in the resin substrate penetration.

Once formed, the wet laminate 302 is cured at room temperature for a predetermined cure time. The predetermined cure time may be influenced by the ambient environment in which the curing process occurs. The cure time may also be influenced by the proportion of iron oxide particle(s) 104(1)-104(N) within the resin substrate 108 and relative proportion of the resin substrate 108 to the reinforced fiber matrix 106.

Figure 4:
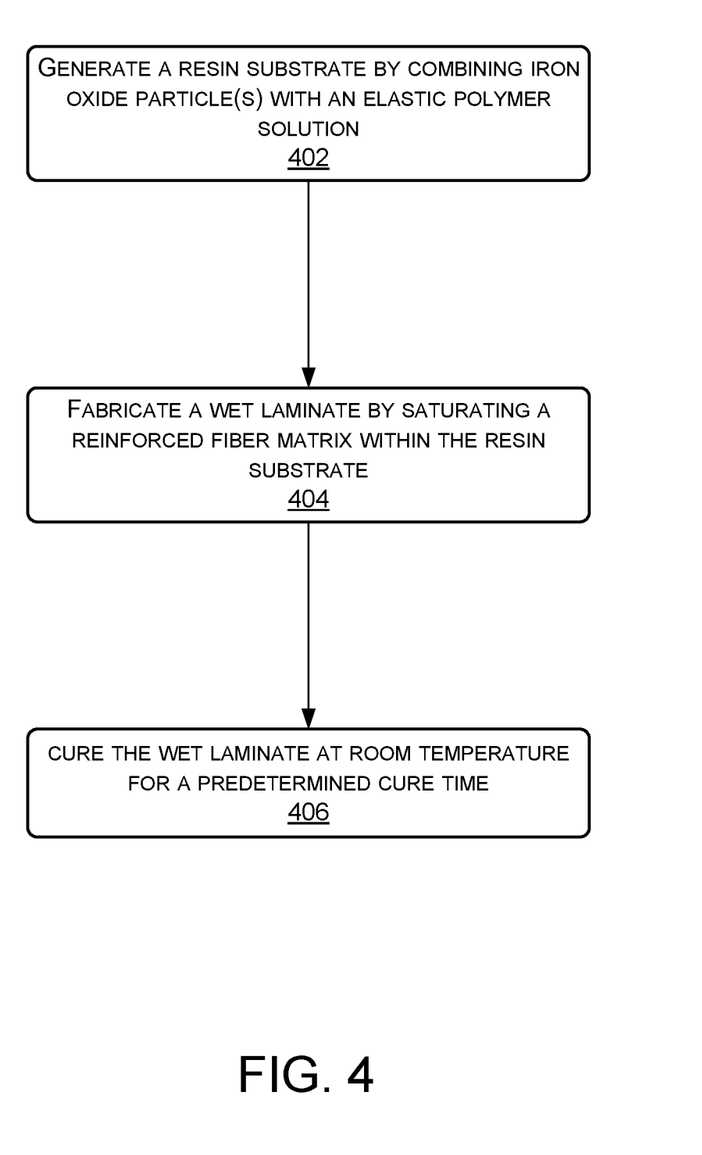
FIG. 4 illustrates a flow diagram of a fabrication process of a textile article (i.e. laminate) that incorporated iron oxide particles that absorb and attenuate RF signals.

FIG. 4 illustrates a flow diagram of a fabrication process of a textile article (i.e. laminate) that incorporated iron oxide particles that absorb and attenuate RF signals.

At 402, the generate a resin substrate by combining iron oxide particle(s) with an elastic polymer solution. The selection of the iron oxide particle(s) is based at least in part on the RF signals that the textile article is intended to absorb and attenuate. For example, a soft ferrite, such as $Fe_3O_4Fe$ may be capable of absorbing low radio frequency signals that are less than 3 GHz. Moreover, an iron oxide, such as $Fe_3O_4Ni$, may be capable of absorbing radio frequency signals within a range of 3 to 8 GHz, and a soft ferrite, such as $Fe_3O_4$, may be capable of absorbing high radio frequency signals that are greater than or equal to 10 GHz.

Additionally, the proportion of iron oxide particle(s) to an elastic polymer solution is also governed by the target range of RF signals. In one example, a textile article that is intended to absorb RF signals within a range of 3 to 8 GHz may comprise of a 1:16 ratio by volume of $Fe_3O_4Ni$ to the elastic polymer solution. In another example, a textile article that is intended to absorb RF signals that are greater than or equal to 10 GHz may comprise a predetermined ratio by volume of $Fe_3O_4$ to the elastic polymer solution equivalent to 1:16. In yet another example, a textile article that is intended to absorb RF signals that are less than 3 GHz may comprise a predetermined ratio by volume of $Fe_3O_4Fe$ to the elastic polymer solution of 1:16.

At 404, fabricate a wet laminate by saturating a reinforced fiber matrix within the resin substrate. The reinforced fiber matrix may comprise a bamboo fiber matrix. Alternatively, the reinforced fiber matrix may comprise any type of fabric, including but not limited to, cotton, polyester, nylon, wool, and/or so forth. The selection of the reinforced fiber matrix may be influenced by the density of the reinforced fiber matrix (i.e. fiber volume ratio) and the desired flexibility and stretch of the intended textile article. For example, an increase in the density of a reinforced fiber matrix may result in an improvement in the resin substrate penetration.

At 406, cure the wet laminate at room temperature for a predetermined cure time. In various examples, the predetermined cure time may be influenced by the ambient environment. For example, a curing process at room temperature in a moist (i.e. humid) environment may have a different cure time to the same curing process that occurs in a dry (i.e. relatively less humid) environment.

Additionally, the cure time may be manipulated by the addition of a thinning fluid or cure retarder. This may occur if the curing time is less than the time required by an operator to uniformly distribute the resin substrate of the reinforced fiber matrix.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A method of fabricating a textile article that is configured to absorb and attenuate radio frequency (RF) signals, the method comprising:
    generating a resin substrate by incorporating a first portion of iron oxide particles and a second portion of an elastic polymer solution;
    generating a wet laminate by saturating a reinforced fiber matrix within the resin substrate;
    determining a cure time for the wet laminate, based at least in part on a volume ratio of the first portion of iron oxide particles by volume relative to the second portion of elastic polymer solution by volume;
    curing the wet laminate at room temperature for the cure time,
    identifying an RF signal range for absorption and attenuation of RF signals to be less than 3 GHz; and
    determining the iron oxide particles to be Fe3O4Fe, based at least in part on the RF signal range, and
    quantifying the first portion of iron oxide particles and the second portion of elastic polymer solution based at least in part of a predetermined ratio by volume of the first portion and the second portion that corresponds to 1:16.

2. The method of claim 1, wherein the cure time is further based at least in part on an additional volume ratio of the resin substrate to the reinforced fiber matrix.

3. The method of claim 1, further comprising:
    determining an RF signal range to which the textile article is to absorb and attenuate RF signals; and
    quantifying the first portion of iron oxide particles based at least in part on the RF signal range.

4. The method of claim 3, further comprising:
    determining a required viscosity to overlay the resin substrate onto the reinforced fiber matrix;
    determining that a current viscosity of the resin substrate is greater than the required viscosity; and
    adding a third portion of at least one of a thinning fluid or a cure retarder to reduce the current viscosity to be less than or equal to the required viscosity.

5. The method of claim 3, further comprising:
    determining that an additional volume ratio of the resin substrate to the reinforced fiber matrix is greater than a predetermined volume ratio, the predetermined volume ratio corresponding to a volume ratio associated with a desired adhesive property associated with the reinforced fiber matrix and the resin substrate; and
    adding at least one of a third portion of thinning fluid or a cure retarder to reduce the volume ratio to be equal to or less than the predetermined volume ratio.

6. The method of claim 1, wherein the iron oxide particles may correspond to one or more of Fe3O4Fe, Fe3O4Ni, and Fe3O4.

7. A method of fabricating a textile article that is configured to absorb and attenuate radio frequency (RF) signals, the method comprising:
    generating a resin substrate by incorporating a first portion of iron oxide particles and a second portion of an elastic polymer solution;
    generating a wet laminate by saturating a reinforced fiber matrix within the resin substrate;
    determining a cure time for the wet laminate, based at least in part on a volume ratio of the first portion of iron oxide particles by volume relative to the second portion of elastic polymer solution by volume; and
    curing the wet laminate at room temperature for the cure time;
    identifying an RF signal range for absorption and attenuation of the RF signals to be greater than or equal to 3 GHz and less than 8 GHz; and
    determining the iron oxide particles to be Fe3O4Ni, based at least in part on the RF signal range, and
    quantifying the first portion of iron oxide particles and the second portion of elastic polymer solution based at least in part of a predetermined ratio by volume of the first portion relative to the second portion that corresponds to 1:16, based at least in part on the RF signal range.

8. A method of fabricating a textile article that is configured to absorb and attenuate radio frequency (RF) signals, the method comprising:
    generating a resin substrate by incorporating a first portion of iron oxide particles and a second portion of an elastic polymer solution;
    generating a wet laminate by saturating a reinforced fiber matrix within the resin substrate;
    determining a cure time for the wet laminate, based at least in part on a volume ratio of the first portion of iron oxide particles by volume relative to the second portion of elastic polymer solution by volume;
    curing the wet laminate at room temperature for the cure time;
    identifying an RF signal range for absorption and attenuation of RF signals to be greater than 10 GHz; and
    determining the iron oxide particles to be Fe3O4, based at least in part on the RF signal range, and
    quantifying the first portion of iron oxide particles and the second portion of elastic polymer solution based at least in part of a predetermined ratio by volume of the first portion relative to the second portion that corresponds to 1:16, based at least in part on the RF signal range.

9. A method of fabricating a textile article that is configured to absorb and attenuate radio frequency (RF) signals, the method comprising:
    generating a resin substrate by incorporating a first portion of iron oxide particles and a second portion of an elastic polymer solution;
    generating a wet laminate by saturating a reinforced fiber matrix within the resin substrate;
    determining a cure time for the wet laminate, based at least in part on a volume ratio of the first portion of iron oxide particles by volume relative to the second portion of elastic polymer solution by volume;
    curing the wet laminate at room temperature for the cure time;
    identifying an RF signal range for absorption and attenuation of RF signals that include RF signals that are less than 3 GHz through to RF signals greater than 10 GHz;

determining the iron oxide particles to be a combination of Fe3O4Fe, Fe3O4Ni, and Fe3O4, based at least in part on the RF signal range, wherein a relative portion by volume of Fe3O4Fe, Fe3O4Ni, and Fe3O4 corresponds to 1:1:1; and quantifying the first portion of iron oxide particles and the second portion of elastic polymer solution based at least in part of a predetermined ratio by volume of the first portion relative to the second portion that corresponds to 1:3, based at least in part on the RF signal range.

10. The method of claim 1, wherein the iron oxide particles retain a spherical or near-spherical shape to reduce reflection of the RF signals.

11. A fabrication process for a textile article that is configured to absorb and attenuate RF signals, the fabrication process comprising:

identifying an RF signal range for absorption and attenuation of the RF signals that include RF signals that are less than 3 GHz through to RF signals greater than 10 GHz;

determining a type of iron oxide particles to be at least one of the following particles: Fe3O4Fe, Fe3O4Ni, and Fe3O4, based at least in part on the RF signal range;

quantifying a first portion of the iron oxide particles and a second portion of elastic polymer solution based at least in part on the RF signal range;

generating a wet laminate by saturating a reinforced fiber matrix within the resin substrate;

determining a cure time for the wet laminate, based at least in part on a volume ration of the first portion of iron oxide particles by volume relative to the second portion of elastic polymer solution by volume; and curing the wet laminate at room temperature for the cure time.

12. The fabrication process of claim 11, further comprising:

determining an amount of viscosity that is required to overlay the resin substrate onto the reinforced fiber matrix, and wherein the first portion of the iron oxide particles and the second portion of the elastic polymer solution is further based at least in part on the amount of viscosity.

13. The fabrication process of claim 11, further comprising:

determining a required viscosity to overlay the resin substrate onto the reinforced fiber matrix;

determining that a current viscosity of the resin substrate is greater than the required viscosity; and adding a third portion of at least one of a thinning fluid or a cure retarder to reduce the current viscosity to be less than or equal to the required viscosity.

14. The fabrication process of claim 11, wherein the iron oxide particles may correspond to one or more of Fe3O4Fe, Fe3O4Ni, and Fe3O4.

15. The fabrication process of claim 11, wherein the fiber matrix corresponds to one of a bamboo fiber matrix, a cotton fiber matrix, a polyester fiber matrix, a nylon fiber matrix, or a wool fiber matrix, and wherein, the elastic polymer solution comprises a natural rubber, an acrylic, or a silicone-based elastic polymer solution.

16. The method of claim 7, wherein the cure time is further based at least in part on an additional volume ratio of the resin substrate to the reinforced fiber matrix.

17. The method of claim 7, further comprising:

determining a required viscosity to overlay the resin substrate onto the reinforced fiber matrix;

determining that a current viscosity of the resin substrate is greater than the required viscosity; and adding a third portion of at least one of a thinning fluid or a cure retarder to reduce the current viscosity to be less than or equal to the required viscosity.

18. The method of claim 8, wherein the cure time is further based at least in part on an additional volume ratio of the resin substrate to the reinforced fiber matrix.

19. The method of claim 8, further comprising:

determining a required viscosity to overlay the resin substrate onto the reinforced fiber matrix;

determining that a current viscosity of the resin substrate is greater than the required viscosity; and adding a third portion of at least one of a thinning fluid or a cure retarder to reduce the current viscosity to be less than or equal to the required viscosity.

20. The method of claim 9, wherein the cure time is further based at least in part on an additional volume ratio of the resin substrate to the reinforced fiber matrix.

* * * * *